US008122136B2

(12) United States Patent
Bernier et al.

(10) Patent No.: US 8,122,136 B2
(45) Date of Patent: Feb. 21, 2012

(54) METHODS AND APPARATUS FOR PROVIDING SECURITY TO A COMPUTERIZED DEVICE

(75) Inventors: Mark Bernier, Holliston, MA (US); Dany J. Rochefort, Norfolk, MA (US); Victor Volpe, Groton, MA (US); Christopher R. Bolinger, Twinsburg, OH (US); Nizar Nassar, North Royalton, OH (US); Marc Tardif, Franklin, MA (US)

(73) Assignee: Cisco Technology, Inc., San Jose, CA (US)

( * ) Notice: Subject to any disclaimer, the term of this patent is extended or adjusted under 35 U.S.C. 154(b) by 1568 days.

(21) Appl. No.: 10/323,276

(22) Filed: Dec. 18, 2002

(65) Prior Publication Data
US 2004/0120260 A1    Jun. 24, 2004

(51) Int. Cl.
*G06F 15/16* (2006.01)
(52) U.S. Cl. .................... 709/229; 709/219; 709/227
(58) Field of Classification Search .................. 709/229, 709/245, 219, 227; 370/254, 331, 338, 392, 370/401; 455/432.2
See application file for complete search history.

(56) References Cited

U.S. PATENT DOCUMENTS

| | | | | |
|---|---|---|---|---|
| 6,079,020 A * | 6/2000 | Liu | ................................. | 726/15 |
| 6,172,981 B1 * | 1/2001 | Cox et al. | ....................... | 370/401 |
| 6,473,411 B1 * | 10/2002 | Kumaki et al. | ................ | 370/331 |
| 6,601,093 B1 * | 7/2003 | Peters | ............................ | 709/220 |
| 6,870,822 B2 * | 3/2005 | Balogh | ......................... | 370/332 |
| 6,871,076 B2 * | 3/2005 | Samn | .......................... | 455/456.1 |
| 6,965,674 B2 * | 11/2005 | Whelan et al. | ................ | 380/270 |
| 6,981,047 B2 * | 12/2005 | Hanson et al. | ................ | 709/227 |
| 7,020,438 B2 * | 3/2006 | Sinivaara et al. | ............ | 455/41.2 |
| 7,133,526 B2 * | 11/2006 | Whelan et al. | ................ | 380/270 |
| 7,571,308 B1 * | 8/2009 | Bahl et al. | ..................... | 713/151 |
| 7,756,956 B2 * | 7/2010 | Jean | ............................... | 709/222 |
| 2002/0021689 A1 * | 2/2002 | Robbins et al. | ............... | 370/352 |
| 2002/0069278 A1 | 6/2002 | Forslow | ........................ | 709/225 |
| 2002/0101860 A1 * | 8/2002 | Thornton et al. | ............ | 370/352 |
| 2002/0138614 A1 * | 9/2002 | Hall | .............................. | 709/225 |
| 2002/0161905 A1 | 10/2002 | Haverinen et al. | ............ | 709/229 |
| 2003/0172307 A1 * | 9/2003 | Henry et al. | .................. | 713/201 |

(Continued)

OTHER PUBLICATIONS

Wei Qu, Sampalli Srinivas, "IPSec-Based Secure Wireless Virtual Private Network, Faculty of computer Science", Dalhousie University, Halifax, NS B3H 1W5, Canada, © 2002 IEEE. British Crown Copyright. pp. 1107-1112.

(Continued)

*Primary Examiner* — Faruk Hamza
*Assistant Examiner* — Oleg Survillo
(74) *Attorney, Agent, or Firm* — Patterson & Sheridan LLP (57) ABSTRACT

When establishing a communications channel to a wireless network, through a wireless connection, a computerized device receives an Internet protocol (IP) address from a Dynamic Host Configuration Protocol (DHCP) server associated with the wireless network. The computerized device is configured with a table or list of IP addresses associated with wireless networks requiring a VPN or secure connection. The computerized device compares the IP address received from the DHCP server with the IP address entries of the table stored by the computerized device. If the computerized device detects a correspondence between the IP address received from the DHCP server and an IP address entry within the table, the computerized device automatically initiates a secure or VPN connection with the wireless network associated with the DHCP server. The computerized device therefore actively establishes a secure connection with the wireless network, prior to user login and without user intervention, based upon the computerized device being a client of the wireless network.

18 Claims, 5 Drawing Sheets

U.S. PATENT DOCUMENTS

2004/0004968 A1* 1/2004 Nassar ............... 370/401
2004/0059944 A1* 3/2004 Stademann ............ 713/201

OTHER PUBLICATIONS

Harri Hansen, "Ipsec and Mobile-IP Ad Hoc Networking", Apr. 25, 2000, XP-002196707, Department of Computer Science and Engineering, Helsinki University of Technology, http://www.htu.ti/~hansen/papers/adhoc/index.

IPSEC Configuration, "Linux FreeS/WAN Configuration", XP-002278975, http://web.archive.org/web/20021008230441/www.freeswan.org/freeswan_trees/freeswan-1.5/.. pp. 1-17.

* cited by examiner

METHODS AND APPARATUS FOR PROVIDING SECURITY TO A COMPUTERIZED DEVICE

BACKGROUND OF THE INVENTION

A computer network, such as the Internet, allows users to transmit data to and receive data from one or more sites or servers associated with the network.

Remote access provides a client computerized device the ability to log onto or access a computer network from a "remote" location. The term "remote" does not refer to physical distance, but rather to a location that is not part of a configured network. One conventional form of remote access involves the use of a virtual private network (VPN). The VPN is a type of private network constructed using a public network infrastructure (e.g., the Internet) to connect divergent network nodes (e.g., remote sites or users). Instead of using a dedicated, physical connection, such as a leased line, a VPN uses "virtual" connections routed from, for example, a company's private central network through a public network (e.g., the Internet) to a remote site or to a remote employee on the road or working from home. Such "virtual" connections are formed in a process known as tunneling. VPN's are conventionally constructed to operate over a public network through the use of a combination of data encapsulation, data encryption, and user authentication.

One of the several types of conventional remote-access VPN environments involves using a client application at a remote site, such as a software client application installed on a remote computer, to connect to a central site, such as a corporate network. A typical example of a VPN employing a software client device is a home-office computer or a laptop of a mobile worker. To establish a VPN connection, a user decides to either transmit or receive data or traffic using the VPN. Conventionally, the user actively engages the software client application and, as a result, the client computer connects to the central site (e.g., a concentrator of a corporate network) via a telephone connection or an Internet Service Provider connection to the Internet. The VPN software client establishes a secure, encrypted tunnel from the client device to the central site over the Internet. Access and authorization to the central site are then controlled from the central site.

While many home computers communicate with the Internet over phone lines, conventional business computers communicate with networks using an Ethernet connection. In an Ethernet network, an Ethernet cable provides a link between a computer's Ethernet adapter and the network. An alternative to Ethernet-connecting computers and other devices to a network involves the use of a wireless local area network (WLAN). With a WLAN, a wireless transceiver (e.g., access point) is Ethernet-connected to the network. The access point uses radio frequency (RF) signals, or radio waves, to communicate with WLAN client adapters in computers and other devices. With a WLAN, then, the medium for communications between a client device and the network is not an Ethernet cable but radio waves that travel between the client device and the access point on the Ethernet network. A WLAN enables a user to move his computer within a geographic area encompassed by the WLAN while maintaining his connection to the network.

SUMMARY OF THE INVENTION

Conventional devices and methods of accessing remote networks suffer from a variety of deficiencies.

Regardless of how a computing device gains access to a network, in certain situations (e.g., with respect to a corporate network) the network connection must be secure. In a secure connection, a user's computer device has authorization to access the network and the user's computer device transmits data to and from the network in a private manner such that other devices cannot access the data. Many organizations, however, deploy WLANs that are not secure. In such unsecure WLANs, a user can gain access to the WLAN without being properly authenticated as a valid network user. The user can also wirelessly transmit and receive data with the network without protecting the data via encryption. An unauthorized user or "hacker" having a computer stationed within the vicinity of the WLAN (e.g., outside of the corporate office) and equipped with a device, such as a wireless sniffer, can view such data transmitted between the WLAN access point and the user. The hacker can, for example, utilize the data to receive an Internet identifier (e.g., Internet protocol address) from the WLAN, and join the network to access the data and services transmitted through the WLAN.

Many organizations choose to secure both remote access and WLAN access by requiring that every remote and WLAN user employ a VPN to gain access to the network. When the use of a VPN is required, a user must establish a VPN connection with a central site or network and actively engage the software client application to establish such a connection. However, while actively engaging the software client application, the user typically navigates through multiple levels of setup procedures. Such navigation can be cumbersome and time consuming to the user.

By contrast, embodiments of the present invention significantly overcome such deficiencies and provide mechanisms and techniques for establishing a data connection to a network. When establishing a communications channel to a wireless network, through a wireless connection, a computerized device receives an Internet protocol (IP) address from a Dynamic Host Configuration Protocol (DHCP) server associated with the wireless network. The computerized device is configured with a table or list of IP addresses associated with wireless networks requiring a VPN or secure connection. The computerized device compares the IP address received from the DHCP server with the IP address entries of the table stored by the computerized device. If the computerized device detects a correspondence between the IP address received from the DHCP server and an IP address entry within the table, the computerized device automatically initiates (e.g., performs an autoinitiation procedure to automatically establish) a secure or VPN connection with the wireless network associated with the DHCP server. A user performs a login procedure after the computerized device establishes a secured connection with the wireless network to prevent outside interference or interception of the communication between the computerized device and the wireless network. The computerized device therefore actively establishes a secure connection with the wireless network, prior to user login and without user intervention, based upon the computerized device being a client of the wireless network.

In one embodiment, the invention relates to a method for establishing a data connection to a first network. In the method, a computerized device detects network identification information for the computerized device where the network identification information is transmitted from a network identification information source associated with the first network. The computerized device compares the network identification information with an address entry, the address entry indicating the corresponding first network requiring a secure data connection and corresponding to the network identification information. In response to detecting a correspondence between the network identification information and the address entry, the computerized device establishes a secure data connection with the first network. By automatically initiating (e.g., performing an autoinitiation procedure to establish) a secure connection with a wireless network, the system, including the computerized device, provides the user with a connection experience to the wireless network similar to the connection experience when the user connects to a network using a physical connection.

In another embodiment, the computerized device establishes a secure wireless data connection to the first network, such as a wireless local area network. The secure connection for a WLAN prevents unauthorized users from remotely intercepting transmissions made between the computerized devices and the wireless network.

In another embodiment, the computerized device monitors for network identification information received by the computerized device. In response to detecting network identification information while monitoring, the computerized device performs the steps of comparing and establishing. By monitoring network identification information, the computerized device establishes a secured connection with the network in response to (e.g., immediately after) receiving the IP address from the DHCP, thereby minimizing a time period in which the computerized device transmits or receives data in an unsecured format that the network is accessible by an unauthorized user.

In another embodiment, the computerized device receives updated network identification information from a network identification information source associated with a second network. The computerized device compares the updated network identification information with an address entry in an initiation information table, the address entry indicating a corresponding second network requiring a secure data connection. In response to detecting a correspondence between the updated network identification information and the address entry in the initiation information table, the computerized device establishes a secure data connection with the second network. Such a process provides mobility of the computerized device and allows the computerized device to perform an autoinitiation procedure to form a secured connection with more than a single network. For example, assume a user moves his computer (e.g., laptop computer) within a corporate office such that, rather than having access to a first WLAN, the computer has access to a second WLAN. By using the described process, the computer can establish secured connection with the second WLAN without re-initiation of the computerized device and without user intervention.

In another embodiment, the computerized device provides a user login access to the computerized device in response to establishing a secure data connection with the first network. For example, when a user activates his computer, the computer first establishes a secure connection with a central site then requests the user provide login information. Such a configuration provides security to the computer by limiting unsecured access to the computer or data stored by the computer.

In another embodiment, when the computerized device performs the step of comparing the computerized device detects a secure connection stop function. The computerized device establishes a non-secure data connection with the first network in response to detecting the secure connection stop function. Alternately, the computerized device prevents establishment of a data connection with the first network in response to detecting the secure connection stop function. The secure connection stop function limits the establishment of a secure or VPN connection with a network to save or not burden network resources.

In another embodiment, after detecting a correspondence between the network identification information and the at least one address entry in the initiation information table, the computerized device detects a profile entry within the initiation information table. The profile entry maps to secure connection instructions relating to establishment of a secure data connection between the computerized device and the first network. The computerized device then retrieves the secure connection instructions indicated by the profile entry to establish a secured connection with the network. By having the secure connection instructions separate from the initiation information table, the user, such as administrator, can map two or more address entries (e.g., ranges of IP addresses) to a single set of secure connection instructions, thereby minimizing the amount of storage required by the computerized device to hold or store multiple secure connection instructions or protocols for multiple entries.

In the case where the computerized device does not detect a correspondence between the network identification information and the address entry in the initiation information table, the computerized device either establishes a non-secure data connection with the first network or prevents establishment of a data connection with the first network.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with a data connection application that when performed on the processor, produces a data connection process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with data connection manager that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

Embodiments of the present invention provide mechanisms and techniques for establishing a data connection with a wireless network. When establishing a communications channel to a wireless network, through a wireless connection, a computerized device receives an Internet protocol (IP) address from a Dynamic Host Configuration Protocol (DHCP) server associated with the wireless network. The computerized device is configured with a table or list of IP addresses associated with wireless networks requiring a VPN or secure connection. The computerized device compares the IP address received from the DHCP server with the IP address entries of the table stored by the computerized device. If the computerized device detects a correspondence between the IP address received from the DHCP server and an IP address entry within the table, the computerized device automatically initiates (e.g., performs an autoinitiation procedure to automatically establish) a secure or VPN connection with the wireless network associated with the DHCP server. A user performs a login procedure after the computerized device establishes a secured connection with the wireless network to prevent outside interference or interception. The computerized device therefore actively establishes a secure connection with the wireless network, prior to user login and without user intervention, based upon the computerized device being a client of the wireless network.

Figure 1:
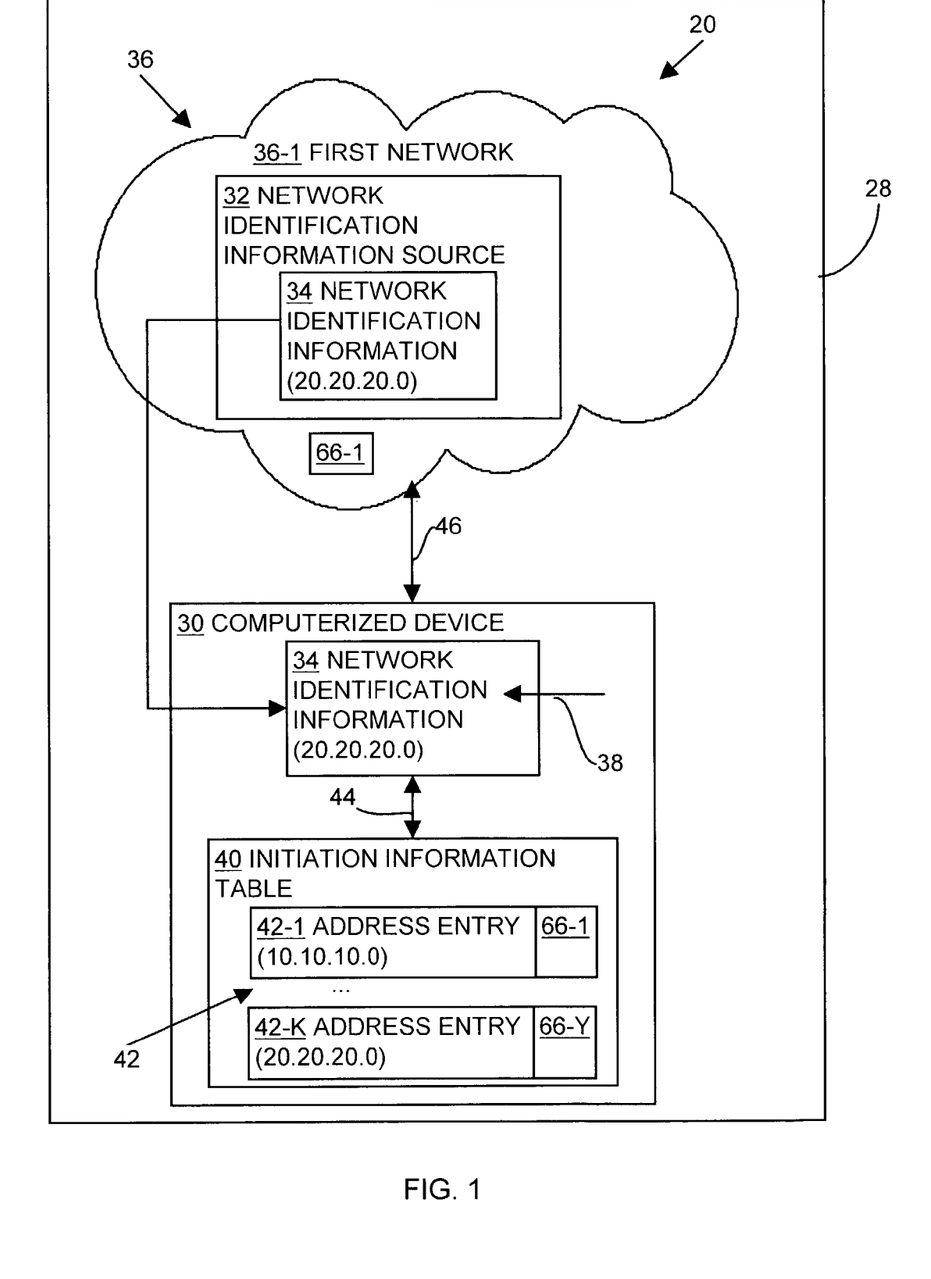
FIG. 1 is a block diagram of a data communication system, configured according to one embodiment of the invention.

FIG. 1 illustrates a data communications system 20, according to one embodiment of the invention. The data communications system 20 includes a network 36 containing a network identification information source 32, a computerized device 30, and a data communication connection 46 formed between the network 36 and the computerized device 30.

As illustrated in FIG. 1, the network 36 includes a single or first network 36-1 having corporate resources, such as computer servers and printers, accessible by users 30 who log into the first network 36-1. In one embodiment, the network 36 is a WLAN and includes a wireless transmitter/receiver for establishment of a wireless connection 46 between the network 36 and computerized device 30. The WLAN, for example, forms part of an on-site corporate network.

The network identification information source 32 forms part of the first network 36-1. In one embodiment, the network identification information source 32 is a DHCP server 32 that assigns dynamic IP addresses to computerized devices 30 when the computerized devices 30 attempt to gain access or log into the first network 36-1.

The computerized device 30 is configured to access or establish a connection with the first network 36-1. The computerized device 30 is either mobile or stationary relative to the first network 36-1. For example, when the first network 36-1 is a WLAN, the computerized device 30 (e.g., a laptop computer) is movable relative to the first network 36-1. In another example the computerized device 30 is stationary (e.g., a personal computer) relative to the first network 36-1.

The connection 46 between the first network 36-1 and the computerized device 30 is a secure data connection that protects or limits the interception of data transmitted between the first network 36-1 and the computerized device 30 by an unauthorized user. For example, the secure data connection includes a VPN connection between the first network 36-1 in the computerized device 30 established using a VPN tunneling protocol such as the IP Security Protocol (IPSec), the Layer 2 Tunneling Protocol (L2TP) or the Point-To-Point Tunneling Protocol (PPTP). In one embodiment, the connection 46 is a secure wireless data connection between the computerized device 30 and the first network 36-1. Such a wireless connection 46, in one embodiment, allows a user to move or relocate the computerized device 30 relative to the first network 36-1 while maintaining the connection 46 in order to access data or resources contained within the first network 36-1.

Figure 2:
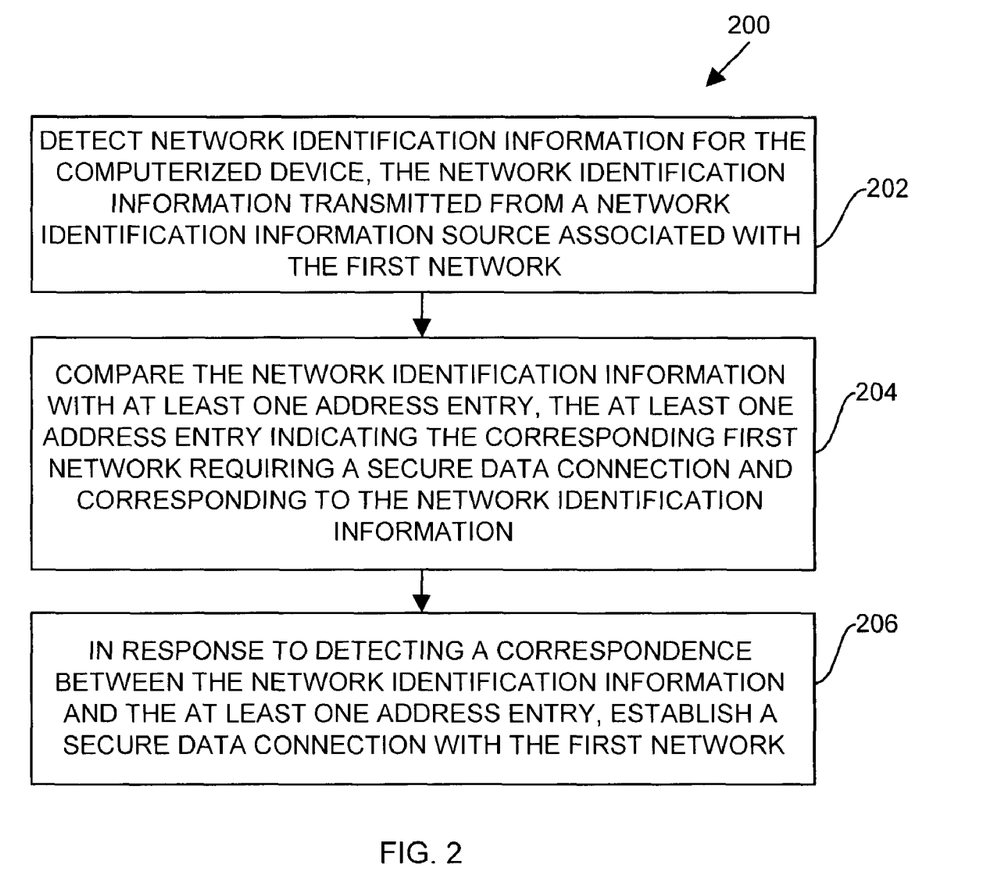
FIG. 2 is a flowchart of a procedure performed by the computerized device of FIG. 1, configured according to one embodiment of the invention.

FIG. 2 illustrates a flowchart showing a method 200 performed by the computerized device 30 of the data communications system 20, according to one embodiment of the invention. In the method 200, the computerized device 32 automatically (e.g., without user intervention) establishes a secured connection 46 to a network 36.

In step 202, the computerized device 30 detects 38 network identification information 34 for the computerized device 30 transmitted from a network identification information source 32 associated with the first network 36-1. The network identification information 34, in one embodiment, is an IP address used by the computerized device 30 as a source IP address when the computerized device 30 engages in communication with the first network 36-1. In order to receive the network identification information 34, a user engages the computerized device 30 (e.g., places the computerized device in an "on" mode of operation). The computerized device 30 receives information indicating the presence of a wireless network 36. For example, a daemon 64 within the client machine 30 watches for potential network connections. After receiving the presence information, the computerized device 30 transmits a message to (e.g., initiates handshaking with) the network 36, or a gateway associated with the network 36, such as a request to establish a communications channel with the network 36. During such communications between the computerized device 30 and the network 36, the network identification information source 32 (e.g., DHCP server) transmits or assigns an IP address to the computerized device 30. For example, as shown in FIG. 1, the network identification information source 32 transmits or assigns an IP address of 20.20.20.0 to the computerized device 30.

In step 204, the computerized device 30 compares 44 the network identification information 34 with an address entry 42 that indicates the corresponding first network 36-1 requiring a secure data connection and corresponding to the network identification information 34. The computerized device 30 in one embodiment, stores the address entry 42 within an initiation information table 40. The initiation information table 40 allows the computerized device 30 to determine when to create a secured connection 46 with a network 36. The initiation information table 40 is configured with multiple address entries 42 or ranges of entries, each entry or range of entries corresponding to the network identification information 34 and indicating a network 36 requiring a secure data connection 46. As illustrated, the initiation information table 40 includes several address entries 42, illustrated as address entry 42-1 through address entry 42-K. Each address entry 42-1, 42-K, in one embodiment, has an associated network address, 66-1, 66-Y, such as the IP address of a concentrator 48 or gateway associated with the network 36.

With respect to FIG. 1 assume that the network identification information 34 is an IP address of 20.20.20.0. Furthermore, assume that the initiation information table 40 includes address entries 42-1 and 42-K where address entry 42-1 is IP address 10.10.10.0 and where address entry 42-K IP address 20.20.20.0. When the computerized device 30 compares 44 the network identification information IP address 20.20.20.0 with the IP address of each address entries 42-1, 42-K, the computerized device 30 detects a correspondence between the network identification information 34 and the address entry 42-K. As illustrated, the address entry 42-K is associated with the network address 66-Y of the first network 36-1.

In one embodiment, the computerized device 30 includes the initiation information table 40 as part of client VPN software or client VPN hardware installed on the computerized device 30. When installing the VPN software or hardware, an administrator configures the initiation information table 40 such that each entry 42 within the table 40 corresponds to a particular range of network addresses that can be assigned to the computerized device 30 by each of the different networks 36 of which the computer and device 30 is a client.

For example, during the handshaking procedure, networks typically transmit an IP address to a requesting client computer where that client computer uses the IP address as a source IP address. Typically, for each network, the IP address falls within a particular range. For example, a first network 36-1 can assign a computerized device 30 an address within the range of 20.20.20.0 to 20.20.20.255. With respect to FIG. 1, assume the first network 36-1 is configured to include the computerized device 30 as a client and also requires a secured connection with the computerized device 30. An administrator pre-configures the initiation information table 40 such that when the computerized device 30 receives an IP address 34 within the range of 20.20.20.0 and 20.20.20.255 and compares the IP address 34 to the entries 42 within the table 40, the computerized device 30 detects the first network 36-1 as the source of the IP address 34 and detects the network 36-1 as requiring a secure connection 46.

In one embodiment, the computerized device 30 combines the address entry 42 (e.g., IP address) within the initiation information table 40 with a mask value or netmask 68. The netmask 68 acts to "mask out" certain portions of an IP address when combined with the IP address. When combined with the netmask 68, each address within a range of IP addresses assignable to the computerized device 30 from a network 36 as network identification information 34 yields a single IP address that the computerized device 30 compares with the address entries 42 within the initiation information table 40.

For example, in one embodiment, the netmask 68 has a value of 255.255.255.0. This particular netmask 68, when combined with an IP address, masks the lowest element of the IP address data range. As described above, the network identification information source 30 transmits a range of IP addresses between 20.20.20.0 and 20.20.20.255 to the computerized device 30. When an IP address 34 within the range of 20.20.20.0 and 20.20.20.255 is combined with the netmask 68 through the process of binary addition, using an AND procedure, the IP address of 20.20.20.0 is returned. The computerized device 30 uses the resultant IP address (e.g., netmasked network identification information) as a basis for comparison against the IP addresses of the address entries 42 within the initiation information table 40.

In step 206, in response to detecting a correspondence 44 between the network identification information 34 and the address entry, the computerized device 30 establishes a secure data connection 46 with the first network 36-1. For example, the computerized device 30 establishes a VPN connection or a VPN tunnel 46 with the first network 36-1. Such a secure connection 46 limits unauthorized users from determining the nature of the communication between the computerized device 30 and the first network 36-1. In the conventional case where the connection 46 between the computerized device 30 and the first network 36-1 is an unsecured, wireless connection, unauthorized users, external to the first network 36-1 (e.g., off site relative to a corporate office) for instance, can intercept data transmitted between the first network 36-1 and the computerized device 30. In the present system 20, contrary to conventional systems, the computerized device 30 automatically, and without user intervention, establishes a secured connection 46 between the first network 36-1 and the computerized device 30 when the computerized device 30 detects that the first network 31-1 requires communication through a secured connection 46.

In certain cases, the computerized device 30 does not detect a correspondence between the network identification information 34 received from the network identification information source 32 and an address entry 42 within the initiation information table 40. Such non-detection can result from the computerized device 30 not being configured to communicate the particular network 36 (e.g., is not a client of the network 36) or from the computerized device 30 not being configured to establish a secure connection 46 with the network 36.

In the case where the computerized device 30 does not detect a correspondence between the network identification information 34 and an address entry 42 within the initiation information table 40, the computerized device 30 prevents establishment of a data connection 46 with the network 36. For example, assume the computerized device 30 includes an initiation information table 40 configured such that the computerized device 30 can establish a secured connection 46 only with the first network 36-1 within an on-site location (e.g., corporate office) 28. Also assume the user attempts to establish a secured connection between a second network 36-2 within the on-site location and the computerized device 30. In such case, when the computerized device 30 receives network identification information 34 from the second network 36-2, the computerized device 30 does not detect a correspondence between the network identification information 34 and the address entries 42 within the initiation information table 40. Because the computerized device 30 is configured to establish a connection only with the first network 36-1, the computerized device 30 prevents establishment of a connection with the second network 36-2.

In another embodiment, in the case where the computerized device 30 does not detect a correspondence between the network identification information 34 and an address entry 42 within the initiation information table 40, the computerized device 30 establishes a non-secure data connection 46 with the network 36. For example, certain networks 46 can require a non-secure connection with a client computerized device 30 in cases where non-confidential data or communications are transmitted between the computerized device 30 and the network 36 By establishing a non-secure data connection 46 with the network 36, the computerized device 30 can still communicate with and transfer data with the network 36.

Figure 3:
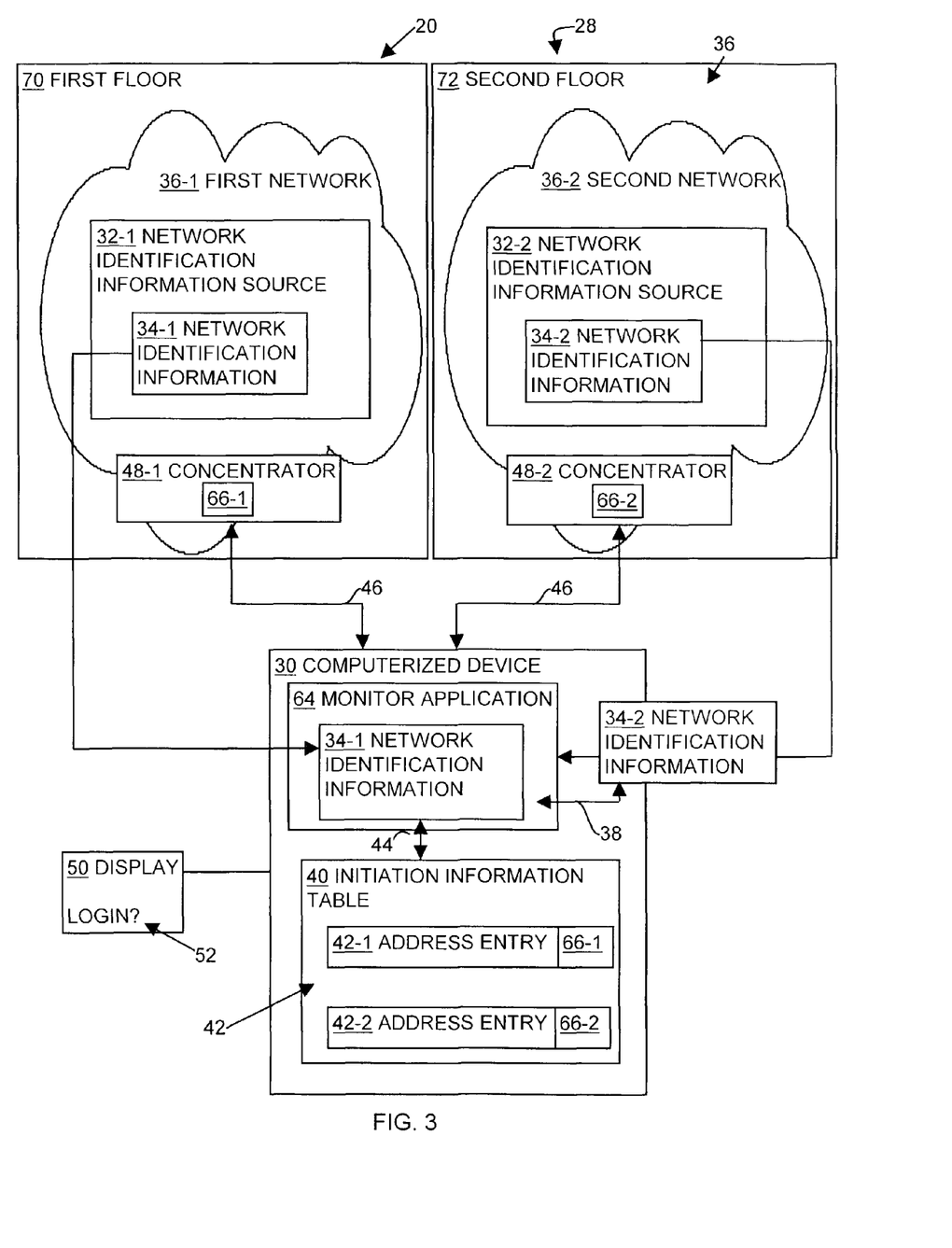
FIG. 3 is a block diagram of a data communication system, configured according to another embodiment of the invention.

FIG. 3 illustrates another embodiment of the data communications system 20 where the data communications system 20 includes the first network 36-1 and a second network 36-2. Each network 36-1, 36-2 includes a concentrator 48-1, 48-2 located at the edge of the network 36-1, 36-2, respectively. A concentrator 48 is a type of multiplexor that combines multiple channels (e.g., communications channels) onto a single transmission medium in such a way that all the individual channels are simultaneously active. For example, concentrators 48 are used in LANs (e.g., the first network 36-1 and the second network 46-2) to combine transmissions from a cluster of nodes (e.g., computerized devices 30). The computerized device 30 forms a secure connection with either the first network 36-1 or the second network 36-2 through the concentrator 48-1, 48-2 associated with the respective network 36-1, 36-2.

The computerized device 30 establishes a secure connection 46 with a network 36 in response, in part, to receiving network identification information (e.g., an IP address) from the network identification information source 32 associated with the network 36. In one embodiment, the computerized device 30 includes a monitoring application 64, such as a monitoring daemon, that monitors for incoming network identification information 34-1 transferred from the network identification information source 32. In response to detecting the presence of network identification information 34-1 by the monitoring application 64, the computerized device 30 compares the network identification information 34-1 to address entries 42-1, 42-2 within the initiation information table 40. Upon detecting correspondence between the initiation identification information 34-1 and the address entry 42, the computerized device 30 establishes a secure connection 46 with a network 36 associated with the address entry 42 (e.g., using the network address 66 to establish a connection with the concentrator 48 of a particular network). By establishing a secure connection 46 with a network 36 in response (e.g., immediately after) detecting network identification information 34, the computerized device 30 blocks all other incoming traffic to the computerized device 30, thereby limiting unauthorized access to the computerized device 30.

In one embodiment, the monitoring demon 64 performs a sampling or detection of network identification information 34 within the computerized device 30 at a give rate, such as once every five seconds. By sampling the network identification information 34 at the given rate, the monitor application detects the presence of updated network information, such as data transmitted by a second network identification information source 32-2 associated with the second network 36-2.

In another embodiment, the computerized device 30 updates the secured connection 46 with a network 36 within the on-site network 28 after receiving updated network identification information 34 from a network identification information source 32. The computerized device 30 establishes a secured connection with a network 36 associated with the network identification information source 32 in response to the receiving the network identification information 34 (e.g., updated IP address).

For example, in FIG. 3, assume that the first network 36-1 is a WLAN located on the first floor 70 of an on-site location 28 and that the second network 36-2 is a WLAN located on the second floor 72 of the same on-site location 28. Also assume that the computerized device 30 has an established secure connection 46 with the first network 36-1. When a user moves the computerized device 30 (e.g., laptop computer) from the first floor 70 to the second floor 72 of the on-site location 28, the user can disrupt the connection 46 between the computerized device 30 and the first network 36-1. Such disruption can allow the computerized device 30 to begin establishment of a secure connection 46 with the second network 36-2.

When the user moves the computerized device 30 from the first floor 70 to the second floor 72, the computerized device 30 receives updated network identification information 34-2 from the network identification information source 32-2 associated with the second network 36-2. In one embodiment, as described above, the computerized device 30 includes a monitoring program 64 that detects 38 the updated network identification information 34-2. After receiving the updated network identification information 34-2, the computerized device 30 compares 44 the updated network identification information 34-2 with address entries 42 within the initiation information table 40. When the computerized device 30 detects a correspondence between the updated network identification information 34-2 and an entry 42 within the information table 40, the computerized device 30 establishes a secured connection 46 (e.g., secured wireless connection), such as a VPN connection, with the second network 36-2.

In another embodiment, the computerized device 30 establishes a secured connection 46 with a network 36 prior to allowing a user to log into or access the computerized device 30. In conventional systems, the user must first log into (e.g., provide a password to gain access to) the computerized device 30 prior to establishing a secured connection 46 with a network 36. With such a conventional system, an unauthorized user can gain access to the computerized device 30 or data stored on the computerized device 30 in the absence of secured connection 46. In the present system 20, because the computerized device 30 establishes a secure connection 46 with a network 36 prior to allowing the user to log into the computerized device 30, the present system 20 minimizes or limits the ability of an unauthorized user to gain access to data stored on the computerized device 30.

In one embodiment, the computerized device 30 provides a user with login access 52 to the computerized device 30 in response to establishing a secure data connection 46 with a network 36. As shown in FIG. 3, in one embodiment, after establishing a secure connection 46 with the first network 36-1 the computerized device 30 provides a login query 52 to the user on a display 50 associated with or communication with the computerized device 30. Based upon the login query 52, the user enters a password or identification that allows the user to access the computerized device 30 and data associated either with the computerized device 30 or the network 36. Because the computerized device 30 automatically establishes a secure connection 46 with a network 36 prior to the user logging into the computer 30, the secure connection 46 limits or prevents establishment of additional connections with the computerized device 30 thereby limiting access to the computerized device 30 by an unauthorized user.

As described above, the initiation information table 40 includes address entries 42 where each address entry 42-1, 42-K relates to or corresponds to a network 36 requiring a secure data connection 46. After detecting a correspondence between the network identification information 34 received from the network identification information source 32 and an address entry 42 within the initiation information table 40, the computerized device 30 establishes a secured connection 46 with the network 36 or network entry point (e.g., concentrator 48) using an associated network address 66 corresponding to the address entry 42. In one embodiment, the computerized device 30 does not store the network address or network information 66, corresponding to the address entry 42, within the initiation information table 40 but accesses the network information 66 from a separate location.

Figure 4:
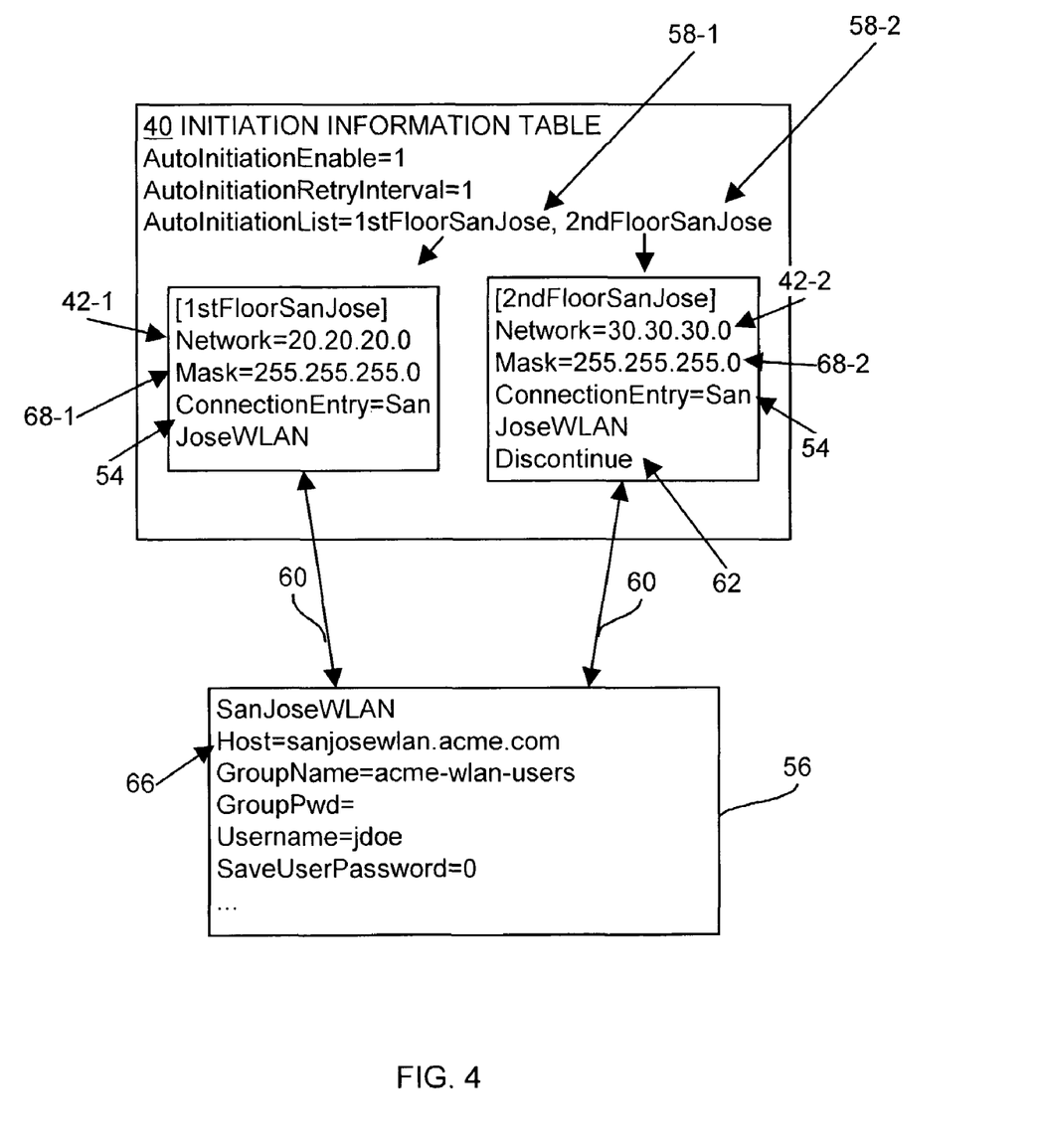
FIG. 4 illustrates an initiation information table, according to one embodiment of the invention.

FIG. 4 illustrates an initiation information table 40 and corresponding secure connection instructions 56, according to one embodiment of the invention. As described above, the initiation information table 40 allows the computerized device 30 to determine when to create a secured connection 46 with a network 36. For example, the computerized device 30 establishes secured connection 46 with a network 36 when the computerized device 30 detects a correspondence between network identification information 34 (e.g., an IP address) received from a network identification information source 32 and an entry 42 within the initiation information table 40. The secure connection instructions 56, however, provide the computerized device 30 with rules or instructions for connecting with a particular network 36 and include the network address 66 of the network requiring the secured connection 46. For example, the secured connection instructions 56 include protocols, such as IPSec, L2TP, or PPTP, used by the computerized device 30 to establish a VPN connection 46 with the network 36. By having the secure connection instructions 56 separate from the initiation information table 40, the user, such as administrator, can map two or more address entries 42 (e.g., ranges of IP addresses) to a single set of secure connection instructions 56, thereby minimizing the amount of storage required by the computerized device 30 to hold or store multiple secure connection instructions or protocols 56 for multiple entries.

In one embodiment, the initiation information table 40 includes information table elements 58. Each information table element 58 within the initiation information table 40 includes an address entry 42, a netmask entry 68, and a profile entry 54. The address entry 42 and the netmask entry 68 are described in detail above. The profile entry 54 maps each information table element 58 to secure connection instructions 56. Each profile entry 54 within each information table element 58 can map to a single set of secure connection instructions 56 or can map to separate, distinct secure connection instructions 56.

In one embodiment as shown in FIG. 4, for example, the initiation information table 40 includes a first information table element 58-1, labeled "1stfloorSanJose" and a second information table element 58-2, labeled "2ndfloorSanJose." In one embodiment, each information table element 58 represents a table entry 42 for individual (e.g., separate) WLAN's within an on-site location 28. For example, the first information table element 58-1 represents a WLAN located on the first floor of a San Jose location while the second information table element 58-2 represents a WLAN located on the second floor of a San Jose location.

When the computerized device 30 receives network identification information 34 (e.g., an IP address) from the network identification information source 32, the computerized device 30 compares the network identification information 34 with the entry 42 within each information table element 58. The computerized device 30 performs such comparisons for each information table element 58 (e.g., "1stfloorSanJose" 58-1 and "2ndfloorSanJose" 58-2) until the computerized device 30 detects a correspondence between the network identification information 34 and an address entry 42 in one of the information table elements 58 or until the computerized device 30 makes a comparison for every information table element 58 within the initiation information table 40 and does not detect a correspondence.

In one embodiment, during the comparison process, the computerized device 30 combines the network identification information 34 with the netmask entry 68 prior to comparing the network identification information 34 with the address entry 42. For example, assume the computerized device 30 receives network identification information 34 having an IP address of 20.20.20.55. The computerized device 30 combines the network identification information 34 with the netmask entry 68-1 of 255.255.255.0 to yield a netmasked network identification information value of 20.20.20.0. The computerized device 30 then compares the netmasked network identification information 34 with the address entry 42-1 within the information table element 58 to detect a correspondence between the netmasked network identification information 34 and the address entry 42-1.

After detecting a correspondence between the address entry 42-1 and the netmasked network identification information 34, the computerized device 30 detects a profile entry 54 within the initiation information table 40 where the profile entry 54 maps to secure connection instructions 56. The computerized device 30 uses the secure connection instructions 56 to establish a secure data connection 46 (e.g., VPN tunnel) between the computerized device 30 and the network 36 corresponding to the network identification information 32. In one embodiment, the computerized device 30 retrieves the secure connection instructions 56 from a storage location, such as a memory or other data storage device, associated with the computerized device 30.

As illustrated in FIG. 4, the profile entry 54 for both the first information table element 58-1 and the second information table element 58-2 indicates a mapping to secure connection instructions 56 entitled "SanJoseWLAN." Upon detecting a correspondence between the address entry 42-1 and the network identification information 34, the computerized device retrieves 60 the corresponding, "SanJoseWLAN" secure connection instructions 56. The secure connection instructions 56 include a network address 66, such as for a gateway or concentrator 48 associated with the network 36 requiring a secured connection 46, for the computerized device 30. For example, as illustrated in FIG. 4, the network address 66 is "sanjosewlan.acme.com." The computerized device 30 executes the secure connection instructions 56 to create a secure connection 46 between the computerized device 30 and the concentrator 48 or network 36 located at the "sanjosewlan.acme.com" address 66.

FIG. 4 also illustrates the information table element 58-2 as including a secure connection stop function 62, such as a "discontinue" command. When the computerized device 30 detects a correspondence between the network identification information 34 and the address entries 42 within the initiation information table 40, the presence of the secure connection stop function 62 prevents the computerized device 30 from establishing a connection with a network 36. In one embodiment, when the computerized device 30 detects the presence of the secure connection stop function 62, the computerized device 30 establishes a nonsecure data connection with the network 36.

The secure connection stop function 62, for example, limits or prevents the computerized device 30 from establishing an unnecessary secure connection 46 with a network 36. For example, the network 36 can require that the computerized device 30 establish a secured connection 46 with the network 36 when a user uses the computerized device 30 away from the on-site location 28. The network can also require the computerized device 30 to establish an unsecured connection 46 with the network 36 when a user uses the computerized device 30 within the on-site location 28. Such a requirement limits the establishment of a secure or VPN connection when the computerized device 30 is on-site (e.g., within the corporate office) to save or not burden network resources within the on-site location 28.

Figure 5:
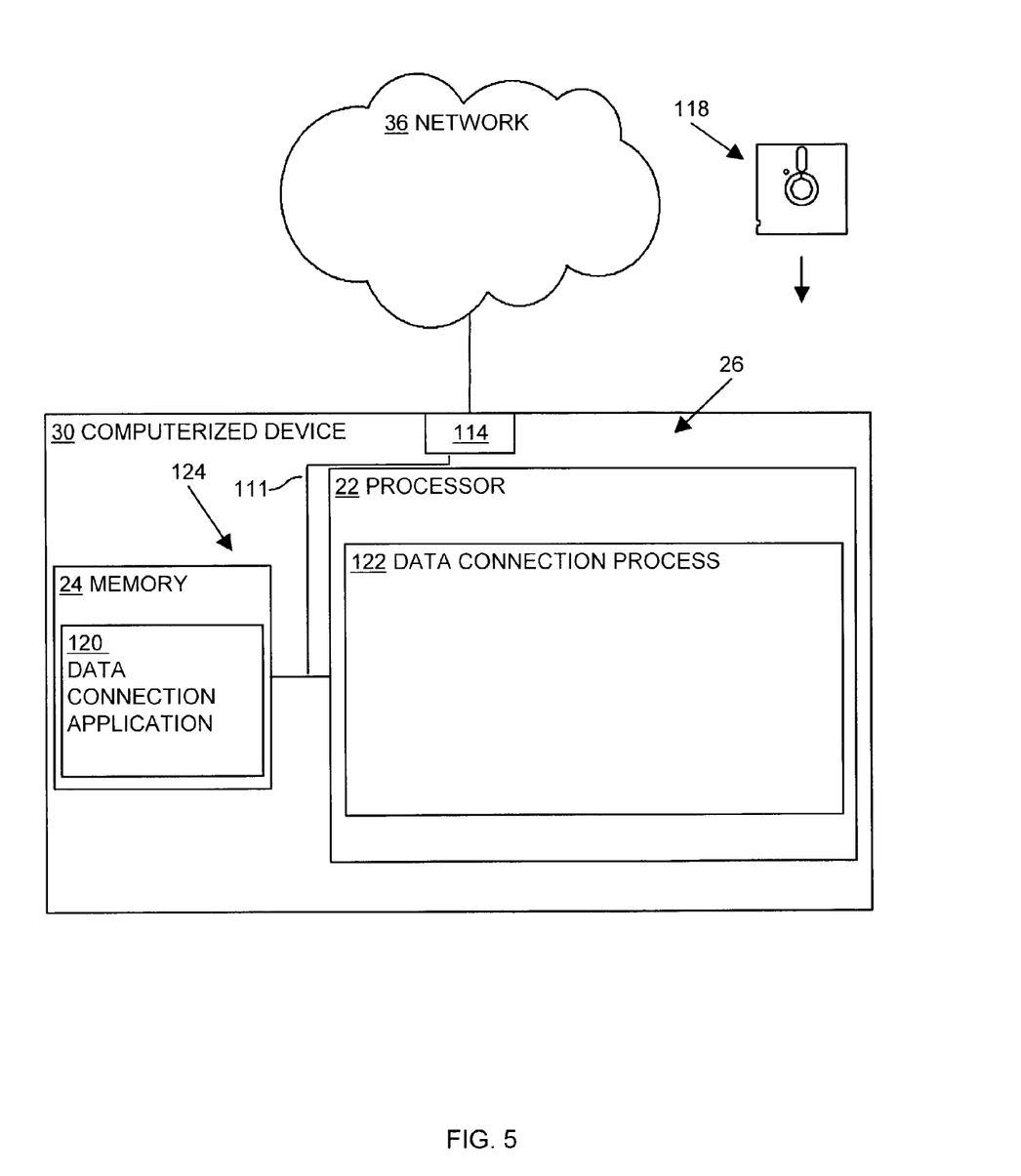
FIG. 5 is a block diagram of a computerized device, configured according to one embodiment of the invention.

FIG. 5 illustrates a more detailed architecture of a computerized device 30 configured according to one embodiment of the invention. A computer program product 118 includes an application or logic instructions, such as data connection instructions, that are loaded into the computerized device 30 to configure the computerized device 30 to establish a secured data connection with the network 36.

The computerized device 30 in this embodiment of the invention includes an interconnection mechanism 111 such as a data bus and/or other circuitry that interconnects a controller 124, including a memory 24 and a processor 22, and one or more communications interfaces 114.

The memory 24 can be any type of volatile or non-volatile memory or storage system such as computer memory (e.g., random access memory (RAM), read-only memory (ROM), or other electronic memory), disk memory (e.g., hard disk, floppy disk, optical disk and so forth). The memory 24 is encoded with logic instructions (e.g., software code) and/or data that form a data connection application 120 configured according to embodiments of the invention. In other words, the data connection application 120 represents software code, instructions and/or data that represent or convey the processing logic steps and operations as explained herein and that reside within memory or storage or within any computer readable medium accessible to the computerized device 30.

The processor 22 represents any type of circuitry or processing device such as a central processing unit, microprocessor or application-specific integrated circuit that can access the data connection application 120 encoded within the memory 24 over the interconnection mechanism 111 in order to execute, run, interpret, operate or otherwise perform the data connection application 120 logic instructions. Doing so forms the data connection process 122. In other words, the data connection process 122 represents one or more portions of the logic instructions of the data connection application 120 while being executed or otherwise performed on, by, or in the processor 22 within the computerized device 30.

Those skilled in the art will understand that there can be many variations made to the embodiments explained above while still achieving the same objective of those embodiments and the invention in general.

As described above, the network 36 is a WLAN and includes a wireless transmitter/receiver for establishment of a wireless connection 46 between the network 36 and computerized device 30. In an alternate embodiment, the connection between the computerized device 30 and the network 36 is a physical connection (e.g., such as by using an Ethernet cable). In such an embodiment, the computerized device 30 performs the steps of detecting, comparing, and establishing (as outlined in FIG. 2) in order to form a secured data connection (e.g., VPN tunnel) with the network 36 through the physical connection.

As described above, the network identification information source 32 forms part of the first network 36-1. In one embodiment, the network identification information source 32 is a DHCP server 32 that assigns dynamic IP addresses to computerized devices 30 when the computerized devices 30 attempt to gain access or log into the first network 36-1. Other types of communications protocols used to establish a connection between the computerized device 30 and the network 46, however, are within the scope of the invention.

FIG. 1 also illustrates a single computerized device 30 connected to the first network 36-1. Multiple computerized devices 30, however, can connect to the first network 36-1, such as through a concentrator 48, to access data and resources associated with the first network 36-1.

Also as described above, the monitoring demon 64 of the computerized device 30 performs a sampling or detection of network identification information 34 at a given rate, such as once every five seconds. By increasing the sampling rate of the monitoring program 64, however, the computerized device 30 decreases the time span between receiving the network identification information 34 and establishing a secure connection 46 with the network 36 (e.g., performing an autoinitiation procedure to establish a secure connection). Therefore, a monitoring application 64 that samples network identification information 34 at a relatively high rate can, in turn, increase the security of the computerized device 30.

Such variations are intended to be covered by the scope of this invention. As such, the foregoing description of embodiments of the invention is not intended to be limiting. Rather, any limitations to the invention are presented in the following claims.

What is claimed is:

1. A method, comprising:
   detecting, in a computerized device, a network identification information for the computerized device, where the computerized device receives the network identification information in a wireless local area network transmission from a network identification information source associated with a first network to which the computerized device is to establish a secure wireless data connection;
   comparing the detected network identification information with at least one address entry stored in an initiation information table on the computerized device, the at least one address entry having been stored in the initiation information table prior to detecting the network identification information and indicating that the first network requires a secure data connection;
   in response to detecting a correspondence between the network identification information and the at least one address entry in the initiation information table, detecting a profile entry, the profile entry being mapped to secure connection instructions for establishing the secure wireless data connection between the computerized device and the first network, retrieving the secure connection instructions indicated by the profile entry, and establishing the secure wireless data connection between the computerized device and the first network; and
   in response to detecting a secure connection stop function within the profile entry, where the secure connection stop function is a discontinue command that prevents the computerized device from establishing an unnecessary secure wireless data connection with the first network, selectively establishing a non-secure data connection between the computerized device and the first network.

2. The method of claim 1, comprising:
monitoring for network identification information; and
in response to detecting network identification information while monitoring, performing the comparing and establishing.

3. The method of claim 1, comprising:
receiving updated network identification information for the computerized device from a network identification information source associated with a second network;
comparing the updated network identification information with at least one address entry, the at least one address entry indicating a corresponding second network requiring a secure data connection and corresponding to the updated network identification information; and
in response to detecting a correspondence between the updated network identification information and the at least one address entry, establishing a secure data connection with the second network.

4. The method of claim 1, comprising, providing a user login access to the computerized device in response to establishing a secure data connection with the first network.

5. The method of claim 1, where establishing a non-secure data connection with the first network comprises preventing establishment of a data connection with the first network in response to detecting the secure connection stop function.

6. The method of claim 1 comprising establishing a non-secure data connection with the first network in response to detecting no correspondence between the network identification information and the at least one address entry.

7. The method of claim 1 comprising preventing establishment of a data connection with the first network in response to detecting no correspondence between the network identification information and the at least one address entry.

8. In a client computer, a method for establishing a data connection to an onsite, wireless local area network comprising the steps of:
detecting address information for the client computer, the address information transmitted from a Dynamic Host Configuration Protocol server associated with the wireless local area network;
comparing the detected address information with at least one address entry stored in an initiation information table on the client computer, the at least one address entry having been stored in the initiation information table prior to detecting the network identification information indicating the corresponding wireless local area network requiring a secure data connection and corresponding to the address information;
in response to detecting a correspondence between the network identification information and the at least one address entry in the initiation information table, detecting a profile entry, the profile entry being mapped to secure connection instructions for establishing the secure data connection between the client computer and the wireless local area network, retrieving the secure connection instructions indicated by the profile entry and performing an autoinitiation procedure to establish the secure data connection with the wireless local area network; and
in response to detecting a secure connection stop function within the profile entry, where the secure connection stop function is a discontinue command that prevents the client computer from establishing an unnecessary secure connection with the wireless local area network, selectively performing the autoinitiation procedure to establish a non-secure data connection with the wireless local area network.

9. A computerized device comprising:
at least one communications interface;
a controller; and
an interconnection mechanism coupling the at least one communications interface and the controller;
wherein the controller is configured to:
detect, in the computerized device, network identification information for the computerized device, the network identification information transmitted from a network identification information source associated with a first network through the at least one communications interface;
compare the detected network identification information with at least one address entry stored on the computerized device in an initiation information table, the at least one address entry having been stored in the initiation information table prior to detecting the network identification information and indicating the corresponding first network requires a secure data connection;
in response to detecting a correspondence between the network identification information and the at least one address entry in the initiation information table, detect a profile entry, the profile entry being mapped to secure connection instructions for establishing the secure data connection with the first network, retrieve the secure connection instructions indicated by the profile entry, and establish the secure data connection with the first network; and
in response to detecting a secure connection stop function within the profile entry, where the secure connection stop function is a discontinue command that prevents the computerized device from establishing an unnecessary secure connection with the first network, selectively establish a non-secure data connection with the first network.

10. The computerized device of claim 9 wherein the computerized device is further configured to:
monitor for network identification information; and
in response to detecting network identification information while monitoring, perform the steps of comparing and establishing.

11. The computerized device of claim 9 wherein the computerized device is further configured to:
receive updated network identification information for the computerized device from a network identification information source associated with a second network through the at least one communications interface;
compare the updated network identification information with at least one address entry, the at least one address entry indicating a corresponding second network requiring a secure data connection; and
in response to detecting a correspondence between the updated network identification information and the at least one address entry, establish a secure data connection with the second network through the at least one communications interface.

12. The computerized device of claim 9 wherein the computerized device is further configured to, in response to establishing a secure data connection with the first network, provide the user login access to the computerized device.

13. The computerized device of claim 9 wherein the computerized device, when comparing, is further configured to prevent establishment of a data connection with the first network in response to detecting the secure connection stop function.

14. The computerized device of claim 9 wherein the computerized device is configured to, when establishing a secure data connection with the first network, establish a secure wireless data connection to the first network through the at least one communications interface.

15. The computerized device of claim 9 wherein, in response to detecting no correspondence between the network identification information and the at least one address entry, the computerized device is further configured to establish a non-secure data connection with the first network.

16. The computerized device of claim 9 wherein, in response to detecting no correspondence between the network identification information and the at least one address entry, the computerized device is further configured to prevent establishment of a data connection with the first network.

17. A computerized device comprising:
at least one communications interface;
a controller; and
an interconnection mechanism coupling the at least one communications interface and the controller;
wherein the controller is configured to:
detect address information for the computerized device, the address information transmitted from a Dynamic Host Configuration Protocol server associated with a wireless network;
compare the detected address information with at least one address entry stored in an initiation information table on the computerized device table prior to detecting the address information, the at least one address entry indicating the corresponding wireless network requiring a secure data connection and corresponding to the address information;
in response to detecting a correspondence between network identification information and the at least one address entry in the initiation information table, detect a profile entry, the profile entry being mapped to secure connection instructions for establishing the secure data connection with the wireless network, retrieve the secure connection instructions indicated by the profile entry, and perform an autoinitiation procedure to establish the secure data connection with the wireless network; and
in response to detecting a secure connection stop function within the profile entry, where the secure connection stop function is a discontinue command that prevents the computerized device from establishing an unnecessary secure connection with the wireless network, selectively performing the autoinitiation procedure to establish a non-secure data connection with the wireless network.

18. A computer program product having a non-transitory computer-readable medium including computer program logic encoded thereon that, when performed on a controller in a computerized device having a coupling to at least one communications interface provides a method for performing the operations of:
detecting, in the computerized device, network identification information for the computerized device, the network identification information transmitted from a network identification information source associated with a first network through the at least one communications interface;
comparing the detected network identification information with at least one address entry stored on the computerized device in an initiation information table, the at least one address entry having been stored in the initiation information table prior to detecting the network identification information and indicating the corresponding first network requiring a secure data connection and corresponding to the network identification information and detecting a secure connection stop function;
in response to detecting a correspondence between the network identification information and the at least one address entry in the initiation information table, detecting a profile entry, the profile entry being mapped to secure connection instructions for establishing the secure data connection between the computerized device and the first network, retrieving the secure connection instructions indicated by the profile entry, and establishing the secure data connection with the first network; and
in response to detecting a secure connection stop function within the profile entry, where the secure connection stop function is a discontinue command that prevents the computerized device from establishing an unnecessary secure wireless data connection with the first network, selectively establishing a non-secure data connection with the first network.

* * * * *